United States Patent [19]

Bechly

[11] Patent Number: 5,961,706
[45] Date of Patent: Oct. 5, 1999

[54] METHOD FOR APPLYING A METALLIC APPEARANCE TO A PLASTIC SUBSTRATE AND AN INK COMPOSITION FOR USE THEREIN

[75] Inventor: Bruce W. Bechly, Winona, Minn.

[73] Assignee: Technigraph Corporation, Winona, Minn.

[21] Appl. No.: 08/950,316

[22] Filed: Oct. 14, 1997

[51] Int. Cl.$^6$ .................................................. C09D 11/02
[52] U.S. Cl. ........................ 106/31.9; 106/403; 106/404
[58] Field of Search ................................ 106/31.9, 31.01, 106/404, 403

[56] References Cited

U.S. PATENT DOCUMENTS 4,292,087  9/1981  Bell .......................................... 106/404
4,564,563  1/1986  Martin et al. ............................. 428/546

FOREIGN PATENT DOCUMENTS

55/012122  1/1980  Japan .
07/310040  11/1995  Japan .

*Primary Examiner*—Helene Klemanski
*Attorney, Agent, or Firm*—Dorsey & Whitney LLP

[57] ABSTRACT

A process for applying a metallic appearance to a plastic substrate comprising providing a metallic printing ink comprising a approximately 5 to 30% for metallic dispersion component comprising metallic particles, and approximately 70 to 95% of a solvent based ink component, applying the metallic printing ink onto the plastic substrate and evaporatively curing the metallic printing ink onto the plastic substrate for approximately 10 to 15 seconds between approximately 200° F. and 300° F., such that the plastic substrate has a metallic appearance.

19 Claims, No Drawings

METHOD FOR APPLYING A METALLIC APPEARANCE TO A PLASTIC SUBSTRATE AND AN INK COMPOSITION FOR USE THEREIN

BACKGROUND OF THE INVENTION

1. Field of the Invention

The present invention relates an ink application process and an ink composition for use therein. More particularly, the present invention relates to a process for applying a metallic appearance to plastic substrates and the metallic printing ink composition used in the process.

2. Background

The appearance of a consumer product, specifically the product's packaging, may be very influential in a consumer's decision to purchase the product. A product packaging that stands out and catches a consumer's eye on a merchant's shelf may be more likely to be purchased by the consumer than the surrounding products. The practical treatment and design options available for certain industries and types of products, however, are often dictated by the packaging material used in connection with a particular product. For example, many products have properties which enable them to be packaged in cardboard or paperboard containers. Printing on cardboard or paperboard substrates provides the packaging designer with a relatively wide range of options for achieving a desired "look" for the packaging. In contrast, because of complications with surface texture, adherence and curing, printing on plastic containers to achieve a desired "look" is much more difficult. Accordingly, printing techniques which work well on cardboard or paperboard substrates often do not work well on plastic substrates.

Product packaging with a metallic appearance or metallic printing provides a particularly pleasing "look" to a consumer of certain products and stands out in bold relief relative to other products on a merchant's shelf. The high speed (60 units per minute or greater) in-line printing of cardboard or paperboard containers or other substrates with a metallic appearance is well known and common in the art. However, the high speed metallic printing of plastic containers, such as those commonly used in the hair care industry, presents a particular challenge primarily because of adherence and curing problems.

One method for providing a metallic appearance to a plastic product packaging substrate is referred to as hot foil stamping. Generally, hot foil stamping involves shrouding the substrate with a die containing a metallic foil material, and heating the die for a period of time such that the metallic foil material is released from the die and is transferred to and adheres to the substrate. In a typical hot foil stamping operation, approximately 7 to 10 substrate items or units may be processed in-line per minute.

Accordingly, hot foil stamping has limitations as a process for providing a metallic appearance to a plastic substrate. First, hot foil stamping process is slow and cannot be performed at typical in-line commercial ink printing speeds. Second, the foil materials utilized in the hot foil stamping process are expensive; thus, the cost per unit for applying a metallic appearance to a plastic container is significantly higher than corresponding in-line printing on cardboard substrates. Third, for many commercial ink printers, operating a hot foil stamping system for plastic substrates is inefficient. A hot foil stamping system generally cannot be adapted to the conventional commercial ink printing operations described below, and instead must operate as a separate system requiring additional space, parts, manpower, and various other costs. Accordingly, these limitations force some product packaging designers and manufacturers to sacrifice a product's appearance for economic concerns.

Thus, there exists a need for a process for providing a metallic appearance to product packaging, in particular to plastic substrates, that may be performed relatively inexpensively, efficiently and at speeds approaching typical in-line commercial ink printing speeds. Ideally, the process should provide a metallic appearance to the substrate similar to that obtained by hot foil stamping.

SUMMARY OF THE INVENTION

In contrast to the prior art, the present invention relates to a method and composition for applying a metallic appearance or print to a plastic substrate, such as a plastic container, at significantly increased production speeds.

Specifically, the present invention comprises a process for applying a metallic appearance to a plastic substrate comprising the steps of providing a metallic printing ink which is comprised of approximately 10 to 25% of a metallic dispersion component and approximately 75 to 90% of a solvent based ink component, printing or otherwise applying the metallic printing ink onto the plastic substrate and evaporatively curing the metallic printing ink under conditions which provide the plastic substrate with a metallic appearance.

Accordingly, it is an object of the present invention to provide a method of providing a metallic appearance or printing to plastic container substrates.

Another object of the present invention is to provide a faster and cheaper method than hot foil stamping for providing a metallic appearance or printing to a plastic container.

A further object of the present invention is to provide a metallic ink composition usable in the above method.

These and other objects of the present invention will become apparent with reference to the description of the preferred method and composition and to the appended claims.

DETAILED DESCRIPTION OF THE PREFERRED METHOD AND COMPOSITION

As described above, there exists a need for a relatively inexpensive and efficient process for providing a metallic appearance, similar to that obtained by hot foil stamping, to a plastic substrate. Additionally, it is desirable that the process be performed at speeds approaching typical in-line commercial ink printing speeds, and, in any case, at printing speeds substantially higher than that of hot foil stamping.

Generally, in commercial ink printing operations, the lowest operational costs, the greatest operational efficiencies and the highest ink printing speeds, are obtained by operations that utilize an ultraviolet ("UV") curing process to cure or dry ink compositions onto substrates. For example, in a typical in-line commercial printing operation utilizing UV curing, a particular substrate is printed with a "UV based" ink, and transported or conveyed in-line to a UV curing unit where the ink is cured onto the substrate nearly instantaneously by UV radiation. Conventional UV curing units are typically one foot in length and the substrates travel through the unit at a speed of about one foot per second or greater. Thus, the processing speed of an UV curing unit consuming approximately one foot of in-line processing space is on the order of one unit per second (60 units per minute) or greater. In comparison, in a typical in-line commercial printing operation utilizing an evaporative curing process, the substrate is printed with a solvent based ink and transported or conveyed in-line through a hot air drying oven. The curing time for a solvent based ink depends primarily on the temperature of the drying oven and the evaporation rate of the particular solvent; however, the curing time is generally significantly slower than that required for UV curing. This in turn requires the processing space or length of the drying oven to be longer than the one foot length of a typical UV curing unit. Thus, to achieve processing speeds competitive with those utilizing UV curing, the hot air drying ovens or units for evaporative curing typically consume ten feet or more of in-line processing space. Thus, commercial printing operations utilizing evaporative curing requires substantially more in-line processing space than operations utilizing UV curing, thereby resulting in significantly lower space utilization efficiencies.

Further, commercial printing operations utilizing evaporative curing are subject to increasing governmental regulations regarding the amount, containment and disposal of solvents and solvent emissions used in the printing process. Commercial printing operations utilizing UV curing and "UV based" inks, are typically subject to significantly fewer, if any, government regulations.

Thus, for the above reasons, among possible others, UV curing of ink compositions onto substrates has become the preferred curing process for most commercial printing operations. Indeed, in the commercial screen printing industry, and various other printing industries as well, operations utilizing evaporative curing have become somewhat of a historical relic. Thus, in any new printing application, the primary focus is on UV curing, with little if any attention being given to processes utilizing evaporative curing.

In formulating a metallic ink composition and a method for applying a desired metallic appearance to a plastic substrate, it was first discovered that metallic ink compositions behaved quite differently when applied to plastic substrates as when applied to paper or paperboard substrates. Specifically, it was unexpectedly discovered that, the desired metallic appearance utilizing certain metallic ink compositions could not be readily obtained with printing operations utilizing UV curing, but could be obtained with printing operations utilizing evaporative curing. More specifically, it was discovered that to obtain the desired metallic appearance, (1) a minimum period of time was required during the curing process for the metallic particles within the metallic ink compositions described herein to "cure down" or settle into a generally horizontal position relative to the plastic substrate, and into a substantially parallel position relative to one another, and (2) a solvent based ink, as opposed to a "UV based" ink, was required for the metallic ink composition to properly adhere to the plastic substrate. In other words, it was unexpectedly discovered that if the curing process cures the metallic ink composition onto the plastic substrate too quickly, such as in a UV curing process, the metallic particles "cure up" or settle in a random manner and the desired metallic appearance is not obtained. Thus, one aspect of the present invention is the discovery and recognition that the generally accepted and commonly used UV curing process generally will not work in applying a metallic ink composition onto a plastic substrates in accordance with the present invention, with any hope of achieving the desired metallic appearance. In contrast, it has been discovered that the relatively slower curing processes, such as evaporative curing, will achieve not only a metallic appearance, but an unexpectedly shiny and reflective metallic appearance similar to that obtained by hot foil stamping.

A further aspect of the present invention, is the discovery that under certain operating parameters, the desired metallic appearance can be applied to plastic container substrates at in-line printing speeds competitive with that of printing operations utilizing UV curing.

As such, the process of the invention may be generally outlined as follows:

1. Mixing a solvent based ink component and metallic dispersion component to obtain a metallic printing ink composition capable of providing the desired metallic appearance to plastic substrates when printed or applied under evaporative curing conditions.

2. Printing or otherwise applying the metallic printing ink onto a suitable plastic substrate.

3. Evaporatively curing the metallic printing ink onto the plastic substrate.

The process should preferably be performed such that (1) the metallic printing ink adheres to the plastic substrate, (2) the desired metallic appearance is provided to the plastic substrate, and (3) the process is performed at speeds close to typical in-line commercial ink printing speeds, and, in any case, at an in-line rate substantially higher than that of hot foil stamping.

The components of the ink composition and the parameters of the process for applying the ink composition of the invention should be guided by the following considerations:

Solvent Based Ink Component

The solvent based ink component of the process and the metallic ink composition may be generally characterized as follows. The resin of the solvent based ink component should be compatible with the plastic substrate and should also provide adhesion for the metallic printing ink to the plastic substrate. Additionally, the solvent of the solvent based ink component should be compatible with the solvent of the metallic dispersion component, which should also be compatible with the plastic substrate. Optionally, the solvent based ink component may be comprised of one or more pigments of various colors that act to provide a colored hue to the metallic appearance ultimately obtained. As used herein, the term "compatible" or "compatible with" is synonymous with solubility or miscibility. In other words, a component which is compatible with a second component means that such component is miscible with or is capable of dissolving in such second component. Components that are compatible may be mixed without reacting chemically or interfering with each components characteristics. Various solvent based ink components will be acceptable for use in the present invention provided they meet the above qualifications. Preferred solvent based ink compositions include the solvent based ink of Coates Screen, Inc. sold under the trademark MONOCAT, the solvent based inks sold by Nazdar Corporation as the 9600 or the 9700 Series, the solvent based inks sold by Coates Screen, Inc. under the trademarks HG 480 Series and FLEXIFORM Series C37 and the solvent based ink sold by Summit Screen Ink under the trademark ZEPHYR-JET. More detailed compositions for some of these inks are set forth in the examples below.

Metallic Dispersion Component

The metallic dispersion component of the process and ink composition may be generally characterized as follows. The metallic dispersion component should be comprised of a solvent compatible with the solvent of the ink and the plastic substrate to which it is to be applied. Further, the dispersion component should be comprised of a percentage by of metallic particles weight of metallic particles sufficient to achieve the desired metallic appearance. Generally, a metallic dispersion component comprised of between about 5% to 15% by weight is preferred, with a metallic dispersion comprised of approximately 10% by weight of metallic particles being most preferred. The metallic particles can be comprised of a variety of metals such as copper, silver and aluminum; however aluminum is the metal preferred.

The metallic particles should preferably have a particle size distribution, defined as the percentage of particles within a range of particle lengths, such that the desired metallic appearance may be ultimately obtained. It has been found that a metallic dispersion component having a particle size distribution of approximately 15% aluminum particles having a length of 3.600 microns to 4.900 microns, approximately 18% aluminum particles having a length of 4.908 microns to 7.950 microns, approximately 15% aluminum particles having a length of 7.957 microns to 10.630 microns, approximately 14% aluminum particles having a length of 10.633 microns to 14.208 microns, approximately 19% aluminum particles having a length of 14.209 microns to 18.980 microns, approximately 13% aluminum particles having a length of 18.986 microns to 27.940 microns, approximately 2% aluminum particles having a length of 27.945 microns to 37.340 microns, and approximately 3% aluminum particles having a length of 37.342 microns to 45.300 microns, is preferred. Similarly, the metallic particles should have an aspect ratio, defined as the ratio of the length of the metallic particles to the width of the metallic particles, such that the desired metallic appearance may be ultimately obtained. It has been found that a metallic dispersion component having an aspect ratio with a minimum of approximately 1.0, a maximum of approximately 5.2 with a mean aspect ration of approximately 1.507 is preferred.

Metallic dispersion components manufactured by various sources will be acceptable provided they have a compatible solvent and a metallic particle concentration and size distribution which results in the desired metallic appearance when printed. The preferred metallic dispersion component is the metallic dispersion component sold under the trademark METALURE and marketed as product number L-56161 by Obron Atlantic Corporation. This component is comprised of 10% by weight aluminum particles, 89% by weight methoxy propanol and 1% by weight acetone.

Metallic Printing Ink

The metallic printing ink is made by mixing the solvent based ink component and the metallic dispersion component and may be generally characterized as follows. The percentage by weight of the metallic dispersion component to the solvent based carrier component should be such that the desired metallic appearance is ultimately obtained. It has been found that a metallic printing ink comprised preferably of approximately 5 to 30% by weight, and more preferably 10 to 25% by weight, of the metallic dispersion component is needed to obtain the desired metallic appearance. Generally, metallic printing inks comprised of more than 30% by weight of the metallic dispersion component results in the appearance of the printed substrate being dark and "muddy" and does not provide the desired metallic appearance. Metallic printing inks comprised of less than approximately 5% by weight of the metallic dispersion component results in the appearance being relatively non-metallic and also does not provide the desired metallic appearance.

It has also been found that if it is desired that the metallic appearance be a purely metallic or silverish appearance, a metallic printing ink comprising approximately 23% by weight of the metallic dispersion component is preferred. If, however, a metallic appearance with a colored hue is desired (e.g., a reddish metallic appearance), a metallic printing ink comprising approximately 12% by weight of the metallic dispersion component is preferred.

The viscosity of the metallic printing ink is dictated primarily by the process by which the ink is printed. For the preferred commercial screen printing process, the viscosity of the metallic printing ink should preferably be above about 300 centipoise, less than about 2000 centipoise and most preferably about 1000 centipoise. While the desired metallic appearance may be achieved with metallic printing inks with viscosities around 300 centipoise, in some cases, bubbling of the metallic printing ink on the plastic substrate tends to occur at these viscosity levels.

For the reasons explained below, the combined solvents of the metallic dispersion component and the solvent based carrier component should have a boiling point such that substantially all of the solvent is evaporated when exposed to oven temperatures from about 150° F. to 300° F. for about 10 to 15 seconds.

Plastic Substrate and Type of Printing

The process and ink composition of the present invention may be satisfactorily applied to a wide range of plastic substrates. Preferred plastic substrates include polyethylene terephthalate, polyethylene, poly vinyl chloride and polypropylene. The process of this invention may utilize a variety of printing or other techniques for applying the printing ink, including screen printing, lithography and gravure printing. The preferred method of printing, however, is screen printing.

Evaporative Curing Step

The oven temperature of the evaporative curing step should be low enough such that the plastic substrates do not melt, warp or deform. For the preferred plastic substrates listed above, the oven temperature should be no greater than about 300° F. The approximate lower limit for the oven temperature is dictated by the characteristics of the combined solvents of the metallic dispersion component and the solvent basad ink component. Combined solvents with boiling points below 150° F. may reduce system stability; i.e., combined solvents with boiling points below 150° F. may begin evaporating during the printing process and prior to curing thereby decreasing the effectiveness and quality of the printed product. Thus, the temperature of the evaporative curing step should be approximately 150° F. to 300° F. and preferably between about 200° F. and 300° F.

The time period during which the printed substrate is exposed to the oven temperatures is dictated by the particular oven temperature, the solvent characteristics of the components and the need and desire to obtain in-line printing speeds close to those of commercial printing operations utilizing UV curing. Because most conventional hot air drying ovens consume approximately 10 feet of in-line processing space, the temperatures, solvent characteristics and other variables should preferably be selected to result in the printed substrates being exposed to the elevated oven temperatures for approximately 10 to 15 seconds. While this time period may be increased by utilizing a hot air drying oven consuming more in-line processing space (e.g., a 15 to 20 foot hot air drying oven), this becomes increasingly impractical in commercial printing operations because of the resulting loss in in-line processing space and other cost increases involved.

Thus, the time period of the evaporative curing step should be approximately 10 to 15 seconds during which the printed substrate is heated at approximately 200° F. to 300° F. In the preferred embodiment, the plastic substrate is evaporatively cured at approximately 250° F. to 275° F. for 10 to 12 seconds. Under these operating parameters, the evaporative curing step may be performed slowly enough to allow the metallic particles to "cure down" in relatively the same plane as the plastic substrate and substantially parallel to one another. This results in a plastic substrate exhibiting the desired metallic appearance. Additionally, under these operating parameters, the overall process of the invention may be performed at an in-line printing speed close to commercial printing operations utilizing UV curing; i.e., performed with an in-line transport speed of approximately 1 foot per second.

The invention may be more thoroughly understood by consideration of the following examples. The examples are set forth for purposes of illustration only and are not intended in a limiting sense. In formulating these examples, parameters of oven temperatures of 200° F. to 275° F. and cure times of 10 to 12 seconds were set. Accordingly, the examples reflect these preferred variables. It is understood, however, that the invention can be practiced at temperature and time conditions outside these limits.

EXAMPLE 1

A metallic printing ink was made by mixing approximately 12% by weight of the a metallic dispersion component sold under the trademark METALURE and marketed as product number L56161 by Obron Atlantic Corporation and approximately 88% by weight of a solvent based ink composition sold by Nazdar Corporation as the 9600 Series. The solvent based ink was comprised of approximately 20 to 35% by weight gamma-butyrolactone dihydro-2 furanone, approximately 15–25% by weight of an aromatic hydrocarbon solvent, approximately 5 to 20 % by weight cyclohexanone, approximately 15–30% by weight resin mixtures, and approximately 0 to 40% by weight various pigments.

The metallic dispersion component was comprised of 10% by weight aluminum particles, 89% by weight methoxy propanol and 1% by weight actetone.

The resulting metallic printing ink was screen printed onto bottles comprised of polyethylene terephthalate, polyethylene and polyvinyl chloride using a 280 strand per inch screen. The printed bottles were evaporatively cured at approximately 250° F. to 275° F. for approximately 12 seconds. In all cases, the desire metallic appearance was obtained.

The adherence of the metallic printing ink to plastic substrate bottles was tested by applying 3M brand 600 tape to the metallic coated plastic substrate and then removing the tape at a 90° angle to the substrate. The metallic printing ink showed generally good adherence to polyethylene terephthalate, but less than desirable adherence to polyethylene and polyvinyl chloride as evidenced by the 3M tape test.

The overall speed of the process was relatively quick and performed at speeds close to commercial screen printing operations utilizing UV curing. At approximately 250° F., the metallic printing ink fully cured onto the plastic substrate, thus allowing the process to be run at approximately 275° F. for even more rapid curing. At approximately 275° F., the metallic printing ink cured in less than approximately 12 seconds.

This metallic printing ink also exhibited unusually high resistance to alcohol making this metallic printing ink more suitable for plastic containers containing alcohol based substances such as hair sprays.

EXAMPLE 2

A metallic printing ink was made by mixing approximately 23% by weight of the Metalure metallic dispersion component of EXAMPLE 1 and approximately 77% by weight of a solvent based ink component sold under the trade name HG 480 Series by Coates Screen, Inc. The solvent based ink component was comprised of approximately 5% by weight butylacetate, approximately 5% by weight of 2-butoxyethylacetate, approximately 10% by weight glycol acid N-butylester, approximately 15% by weight diacetone alcohol, approximately 20 % by weight cyclohexanone, with the balance being resins and various additives.

The resulting metallic printing ink was screen printed onto bottles comprised of polyethylene terephthalate, polyethylene and polyvinyl chloride using a 280 strand per inch screen. The printed bottles were evaporatively cured at approximately 250° F. to 275° F. for approximately 10 to 12 seconds. In all cases, the desired metallic appearance was obtained.

The metallic printing ink showed generally good adherence to polyvinyl chloride, but less than desirable adherence to polyethylene and polyethylene terephthalate as evidenced by the 3M tape test.

The overall speed of the process was relatively quick and performed at speeds close to commercial screen printing operations utilizing UV curing. At approximately 250° F., the metallic printing ink fully cured onto the plastic substrates, thus allowing the process to be run at approximately 275° F. for even more rapid curing. At approximately 275° F., the metallic printing ink cured in less than approximately 12 seconds.

EXAMPLE 3

A metallic printing ink was made by mixing approximately 12% by weight of the Metalure metallic dispersion component of EXAMPLE 1 and approximately 88% by weight of a solvent based ink component sold under the trade name Zephyr-Jet by Summit Screen Ink. The solvent based ink component was comprised of approximately 20 % by weight glycol ether EP, approximately 3% by weight ethylene glycol monobutyl ether, with the balance being diacetone alcohol, resins, pigments and various additives.

The resulting metallic printing ink was screen printed onto bottles comprised of polypropylene using a 280 strand per inch screen. The printed bottles were evaporatively cured at approximately 250° F. to 275° F. for approximately 10 to 12 seconds. The desired metallic appearance was obtained. The metallic printing ink showed generally good adherence to the polypropylene bottles as evidenced by the 3M tape test.

The overall speed of the process was relatively quick and performed at speeds close to commercial screen printing operations utilizing UV curing. At approximately 250° F., the metallic printing ink fully cured onto the plastic substrates, thus allowing the process to be run at approximately 275° F. for even more rapid curing. At approximately 275° F., the metallic printing ink cured in less than approximately 12 seconds.

EXAMPLE 4

A metallic printing ink was made by mixing approximately 12% by weight of the Metalure metallic dispersion component of EXAMPLE 1 and approximately 88% by weight of a solvent based ink component sold under the trade name Flexiform Series C37 by Coates Screen, Inc. The solvent based ink component was comprised of approximately 3% by weight diacetone alcohol, approximately 2% by weight of ethyl 3-ethoxypropionate, approximately 32% by weight dipropylene glycol monomethyl ether, approximately 2% petroleum solvent, approximately 3% xylene, approximately 3% ethyl alcohol, approximately 12% ethylene glycol N-propyl ether, with the balance being resins, pigments and various additives.

The resulting metallic printing ink was screen printed onto bottles comprised of polyethylene terephthalate, polyethylene and polyvinyl chloride using a 280 strand per inch screen. The printed bottles were evaporatively cured at approximately 200° F. to 275° F. for approximately 10 to 12 seconds. In all cases, the desired metallic appearance was obtained.

The metallic printing ink showed generally good adherence to polyethylene terephthalate, but less than desirable adherence to polyethylene and polyvinyl chloride as evidenced by the 3M tape test.

The overall speed of the process was relatively quick. At approximately 200° F., the metallic printing ink properly cured onto the plastic substrates, thus allowing the process to be run at approximately 275° F. for even more rapid curing. In general, the metallic printing ink of EXAMPLE 4 provided the quickest curing of all the examples and most closely approximated the printing speed of commercial screen printing operations utilizing UV curing.

Because it will be readily apparent to those skilled in the art that innumerable variations, modifications, applications, and extensions of these embodiments and principles can be made without departing from the principles and spirit of the invention, it is intended that the scope of the invention be only limited as necessitated by the accompanying claims.

I claim:

1. A process for applying a metallic appearance to a plastic substrate comprising:
   (a) providing a metallic printing ink comprising;
      (i) a metallic dispersion component comprising metallic particles; and
      (ii) a solvent based ink component;
   (b) applying the metallic printing ink onto the plastic substrate; and
   (c) evaporatively curing the metallic printing ink onto the plastic substrate at temperatures between approximately 200° F. to 300° F. for approximately 10 to 15 seconds.

2. The process of claim 1 wherein the metallic printing ink comprises approximately 5 to 30% by weight of the metallic dispersion component.

3. The process of claim 2 wherein the application step comprises screen printing the metallic printing ink onto the plastic substrate.

4. The process of claim 3 wherein the metallic dispersion component comprises approximately 5 to 15% by weight metallic particles.

5. The process of claim 4 wherein the metallic particles are aluminum particles.

6. The process of claim 5 wherein the plastic substrate is selected from the group consisting of polyethylene terephthalate, polyethylene, poly vinyl chloride and polypropylene.

7. The process of claim 6 wherein the metallic printing ink is evaporatively cured for approximately 10 to 12 seconds.

8. The process of claim 7 wherein the metallic printing ink is cured at approximately 250° F. to 275° F.

9. The process of claim 8 wherein the metallic particles have particle size distribution of approximately 15% aluminum particles having a length of 3.600 microns to 4.900 microns, approximately 18% aluminum particles having a length of 4.908 microns to 7.950 microns, approximately 15% aluminum particles having a length of 7.957 microns to 10.630 microns, approximately 14% aluminum particles having a length of 10.633 microns to 14.208 microns, approximately 19% aluminum particles having a length of 14.209 microns to 18.980 microns, approximately 13% aluminum particles having a length of 18.986 microns to 27.940 microns, approximately 2% aluminum particles having a length of 27.945 microns to 37.340 microns, and approximately 3% aluminum particles having a length of 37.342 microns to 45.300 microns.

10. The process of claim 9 wherein the aspect ratio of the metallic particles has a minimum of approximately 1.0, a maximum of approximately 5.2 and a mean of approximately 1.507.

11. The process of claim 1 wherein the metallic particles align in a substantially horizontal position relative to the plastic substrate and in a substantially parallel position relative to one another when the metallic printing ink has been cured onto the plastic substrate.

12. The process of claim 3 wherein the metallic printing ink is screen printed through a screen having approximately 280 strands per inch.

13. The process of claim 1 wherein said solvent based ink component includes an ink solvent compatible with the plastic substrate on which the metallic appearance is applied.

14. The process of claim 13 wherein said metallic dispersion component includes a dispersion solvent compatible with said ink solvent and the plastic substrate on which the metallic appearance is applied.

15. An ink composition comprising:
  (a) approximately 5 to 30% by weight of a metallic dispersion component comprising a dispersion solvent and metallic particles, wherein the metallic particles comprise approximately 5% to 15% by weight of the metallic dispersion component; and
  (b) approximately 70 to 95% by weight of a solvent based ink component comprising an ink solvent, said dispersion solvent and said ink solvent being compatible with each other;
  wherein the ink composition provides a metallic appearance when evaporatively cured onto plastic substrates.

16. The ink composition of claim 15, wherein the metallic particles are aluminum particles.

17. The ink composition of claim 16 wherein the metallic particles have particle size distribution of approximately 15% aluminum particles having a length of 3.600 microns to 4.900 microns, approximately 18% aluminum particles having a length of 4.908 microns to 7.950 microns, approximately 15% aluminum particles having a length of 7.957 microns to 10.630 microns, approximately 14% aluminum particles having a length of 10.633 microns to 14.208 microns, approximately 19% aluminum particles having a length of 14.209 microns to 18.980 microns, approximately 13% aluminum particles having a length of 18.986 microns to 27.940 microns, approximately 2% aluminum particles having a length of 27.945 microns to 37.340 microns, and approximately 3% aluminum particles having a length of 37.342 microns to 45.300 microns.

18. The ink composition of claim 17 wherein the aspect ratio of the metallic particles has a minimum of 1.0, a maximum of 5.2 and a mean of approximately 1.5.

19. The ink composition of claim 15 comprising approximately 10 to 25% by weight of said metallic dispersion component and approximately 75 to 90% by weight of said solvent based ink component.

* * * * *